United States Patent [19]

Kinney, Jr. et al.

[11] Patent Number: 4,769,187
[45] Date of Patent: Sep. 6, 1988

[54] DRIFT ELIMINATOR SUPPORT, DRAINBOARD AND SEAL UNIT FOR WATER COOLING TOWERS

[75] Inventors: Ohler L. Kinney, Jr., Leawood; Joyce D. Holmberg, Overland Park, both of Kans.

[73] Assignee: The Marley Cooling Tower Company, Mission Woods, Kans.

[21] Appl. No.: 95,465

[22] Filed: Sep. 11, 1987

[51] Int. Cl.[4] .............................................. B01D 47/00
[52] U.S. Cl. .................................... 261/110; 261/111; 261/DIG. 11; 261/DIG. 85; 55/440; 55/466
[58] Field of Search .................... 55/440, 466; 261/DIG. 85, DIG. 11, 111, 110

[56] References Cited

U.S. PATENT DOCUMENTS

| | | | |
|---|---|---|---|
| 3,468,521 | 9/1969 | Furlong et al. | 261/DIG. 11 |
| 3,708,155 | 1/1973 | Holmberg et al. | 261/24 |
| 3,743,257 | 7/1973 | Fordyce | 261/112 |
| 3,834,861 | 9/1974 | Fordyce et al. | 261/111 |
| 4,178,160 | 12/1979 | Rahman | 55/440 |
| 4,514,202 | 4/1985 | Kinney et al. | 55/440 |

*Primary Examiner*—Bernard Nozick
*Attorney, Agent, or Firm*—Hovey, Williams, Timmons & Collins

[57] ABSTRACT

Low cost sealing drainboard supports adapted for use between adjacent drift eliminator sections in water cooling towers are provided which can be readily installed in the field without the necessity of custom fabrication of structural components, and which give improved drainage characteristics in the form of relatively large, concentrated streams of eliminated water resistant to reentrainment. The preferred supports are unitary, preformed synthetic resin bodies presenting an elongated, eliminator section-receiving channel together with a depending inner sealing wall and a oblique, downwardly and outwardly extending drainage tray. The tray is preformed to present a series of generally V-shaped in plane, increasing depth drainage passageways serving to collect and concentrate eliminated water into relatively large streams resistant to reentrainment in the air currents passing through the tower.

16 Claims, 2 Drawing Sheets

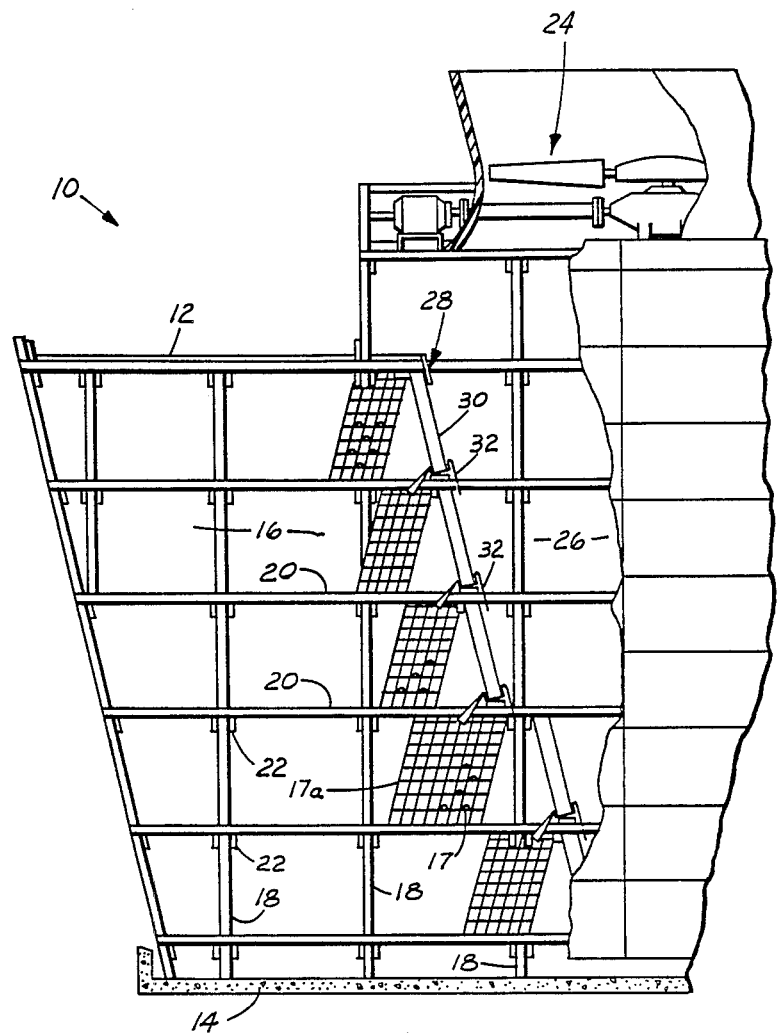
Fig. 1
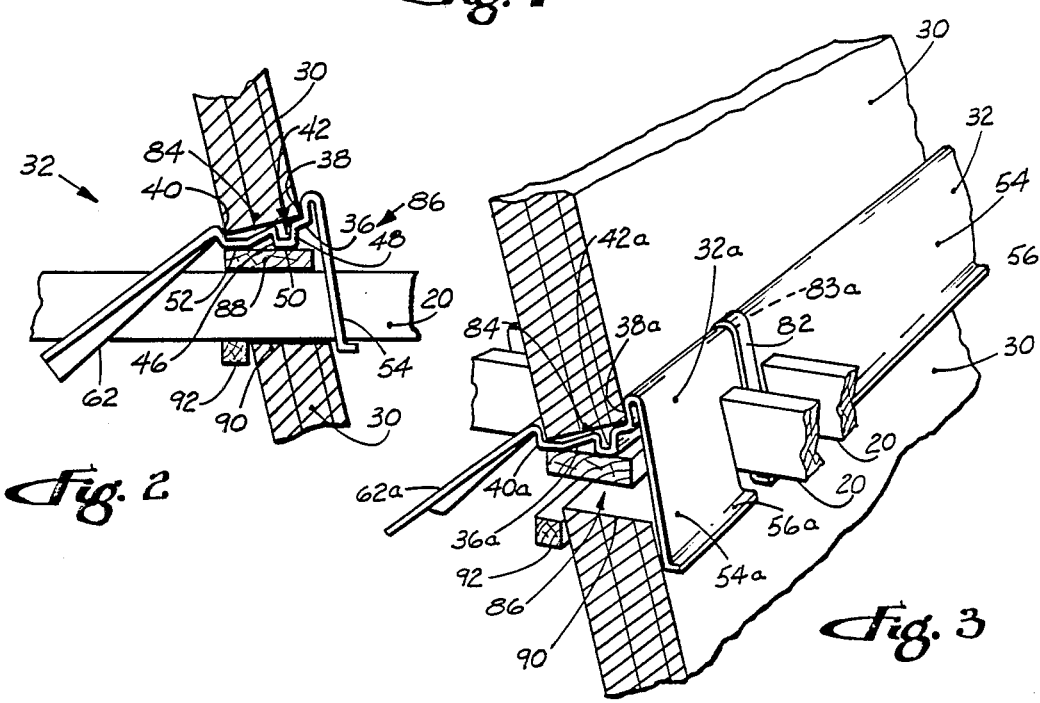
Fig. 2
Fig. 3

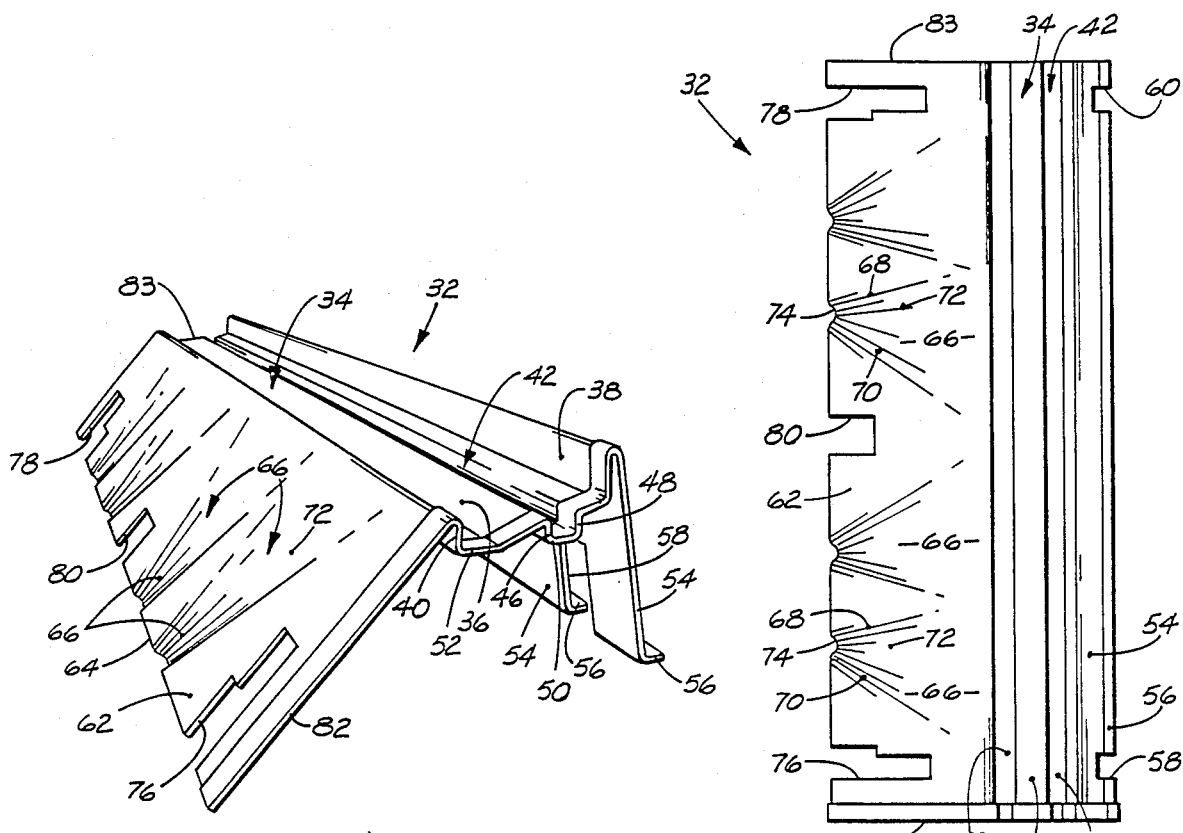
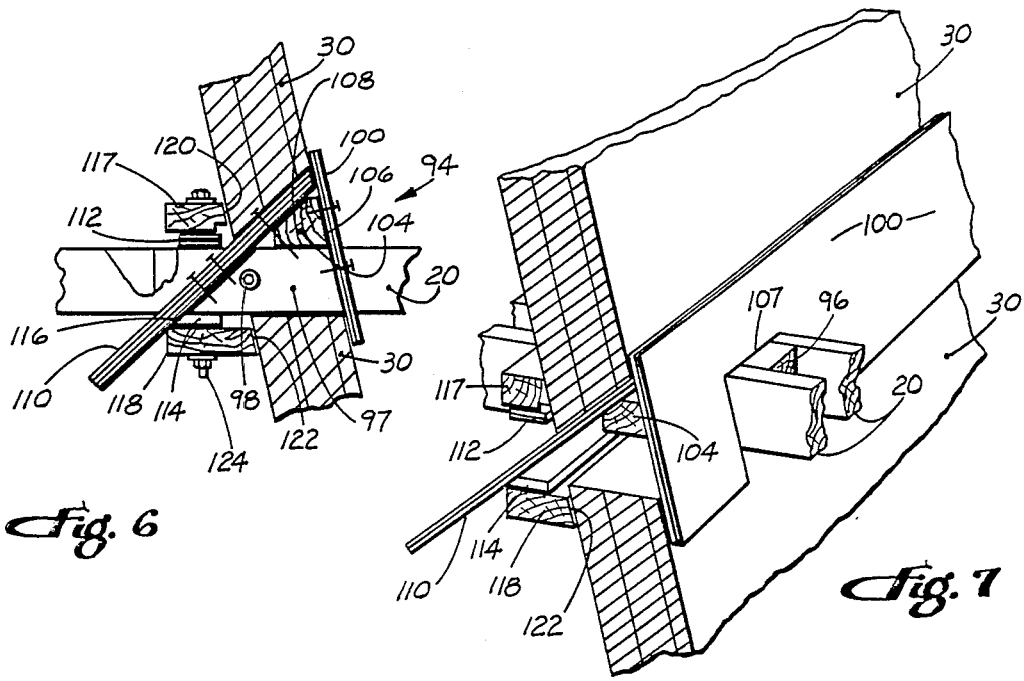

DRIFT ELIMINATOR SUPPORT, DRAINBOARD AND SEAL UNIT FOR WATER COOLING TOWERS

BACKGROUND OF THE INVENTION

1. Field of the Invention

The present invention is concerned with novel, low cost, support, drainboard and seal devices designed for use between drift eliminator packs of large industrial water cooling towers in lieu of complicated, expensive, custom-fabricated wooden assemblies traditionally employed in this context. More particularly, the invention pertains to unitary, synthetic resin support, seal and drainage devices which can be interposed between eliminator packs using a minimum of on-site labor with consequent significant cost savings; moreover, the unique drainage tray forming a part of the invention collects and concentrates eliminated water droplets into relatively large streams which are resistant to reentrainment in air currents passing through the tower.

2. Description of the prior Art

Crossflow water cooling towers broadly are comprised of an elevated hot water basin together with underlying fill structure and a lowermost cold water collection basin. Means such as powered fans are used to draw air currents through the fill structure in intersecting relationship to descending hot water from the hot water basin. Initially hot water is dispersed in the fill structure and is evaporatively cooled by the crossflowing air currents.

Such towers also conventionally include drift eliminator assemblies positioned adjacent the inner faces of the fill. Commonly, such drift eliminators are in the form of upright, obliquely oriented, superposed sections or packs which cooperatively extend the full height of the fill. The purpose of these drift eliminators is to remove entrained air droplets from the crossflowing air current prior to discharge thereof into the atmosphere; in this way the tower discharge does not contain objectionable amounts of water which can lead to corrosion problems on adjacent structures and equipment, or to environmental concerns because of minerals or organisms in the water. A variety of eliminator designs have been proposed in the past, such as the so-called "cellular" eliminators disclosed in U.S. Pat. No. 4,514,202. These eliminators are extremely efficient from the standpoint of water droplet removal.

In the fabrication of water cooling tower drift eliminator assemblies, a problem is presented at the region of the joints between vertically adjacent eliminator sections. That is to say, it is necessary that these elongated, transverse joints be sealed to prevent the passage of moisture-laden air currents therethrough, which of course would not be subjected to the effects of the eliminators. At the same time, the eliminator sections (which can be relatively large in the case of industrial towers) must be adequately supported. Finally, it is very desirable to properly drain water gravitating from the eliminator sections in a manner to ensure that such water is not immediately reentrained in the crossflowing air currents passing through the tower.

In the case of towers making use of wooden structural girts and uprights, the conventional practice has been to custom-fabricate wooden support, drain and sealing devices between adjacent eliminator sections. Generally speaking, this has involved fabrication of joint-sealing plates along the air exit faces of the adjacent eliminator sections of a height to cover the joint and to prevent leakage of moisture-laden air therethrough. The drainage function has been performed by a obliquely and outwardly extending plate or plates positioned beneath the lower margin of each individual eliminator section. These sealing and drainboards are in turn supported by a series of specially fabricated wooden beam and planks which typically must be sawn at relatively critical bevel angles and carefully positioned and secured in place upon installation.

In addition, use of oblique, planar drain boards between the fill sections has resulted in water drainage in the form of small streams or a thin sheet from the lower margins of the drainboards. Such a drainage pattern is susceptible to substantial reentrainment of water droplets as they descend toward the underlying fill. As a consequence, the effectiveness of the overall drift eliminator assembly of the tower has been compromised.

SUMMARY OF THE INVENTION

The present invention overcomes the problems above with a greatly improved seal and drainage support for use between adjacent drift eliminator sections. Preferably, although not necessarily, the support members of the invention are intregrally formed of an appropriate synthetic resin material such as ABS plastic, and in this form can readily be installed using relatively unskilled labor. In any event, the sealing drainboard support of the invention broadly includes structure defining an elongated, upwardly opening channel for receiving the lower margin of an eliminator section, together with an elongated, upright sealing wall operably coupled with the channel-defining structure. The sealing wall is located adjacent the joint region between upper and lower eliminator sections, and is of sufficient height and configured for substantially blocking airflow through the joint region. Advantageously, the sealing wall is situated to be closely adjacent the air exit faces of the adjacent eliminator sections.

The overall sealing drainboard support also includes drainage means associated with the channel-defining structure and located adjacent the air inlet faces of the superposed eliminator sections. Such drainage means is preferably in the form of an elongated tray having a plurality of spaced apart, somewhat V-shaped in plan water drainage passageways therein. These passageways are shaped with converging sidewalls from top to bottom of the tray, and similarly with increasing depth from top to bottom of the tray. In this fashion, water is collected in the passageways and is concentrated into individual, relatively large streams. Such streams are extremely resistant to reentrainment and therefore readily gravitate through the fill structure for collection in the cold water basin.

Use of sealing drainboard supports in accordance with the invention is expected to reduce costs by a factor from 25 to 50%, as compared to conventional, custom fabricated wooden eliminator supports. While a variety of eliminator designs may be used with the supports of the invention, it is contemplated that the cellular eliminators disclosed in U.S. Pat. No. 4,514,202 will be the eliminator of choice; accordingly, this patent is incorporated by reference herein.

In is further contemplated that appropriately modified sealing drainboard supports may be used to good effect in the case of concrete tower structures of the type exemplified by U.S. Pat. No. 3,834,861 and circular mechanical draft towers as shown in U.S. Pat. No. 3,743,257; and these patents are likewise incorporated by reference herein.

BRIEF DESCRIPTION OF THE DRAWINGS

FIG. 1 is a fragmentary view in partial vertical section with parts broken away for clarity of a mechanical draft, crossflow water cooling tower equipped with honeycomb drift eliminator sections and the drainage sealing supports of the invention operatively disposed between adjacent superposed eliminator sections;

FIG. 2 is a fragmentary view illustrating the operative orientation of a drainage sealing support of the invention disposed between a pair of eliminator sections;

FIG. 3 is fragmentary perspective view of the assembly illustrated in FIG. 2;

FIG. 4 is a perspective view of an integral drainage sealing support in accordance with the invention;

FIG. 5 is a plan view of the support depicted in FIG. 4;

FIG. 6 is a view similar to that of FIG. 2, but illustrating a conventional, custom fabricated wooden assembly heretofore used between adjacent eliminator sections; and FIG. 7 is a perspective view of the prior art structure depicted in FIG. 6.

DESCRIPTION OF THE PREFERRED EMBODIMENT

Turning now to the drawings, FIG. 1 depicts a crossflow water cooling tower 10 equipped with an upper hot water distribution basin 12 and a lowermost cold water collection basin 14. The tower arrangement further includes fill structure 16 between the basins 12 and 14 in the exemplary formof elongated fill bars 17 situated on appropriate support structure 17a. A series of specially placed and positioned upright columns 18 are provided in the fill region, together with laterally extending girts 20 and 22. It will be appreciated that the girts 20 in effect define supports for the structure 17a and fill bars 17.

The tower 10 is of the mechanical draft variety, and for this purpose includes one or more fan assemblies 24 in communication with a central plenum region 26 and fill structure 16. In addtion, the tower 10 has an upright drift eliminator assembly 28 which is interposed between the fill structure 16 and plenum region 26. Assembly 28 is made up of a plurality of obliquely oriented, superposed drift eliminator packs or sections 30 which extend from the bottom of tower 10 to a point adjacent basin 12. Elongated sealing drainboard supports 32 are interposed between adjacent superposed eliminator sections 30 as shown.

As those skilled in the art will appreciate, fan assembly 24 serves to draw crossflowing ambient air currents through the fill structure 16, eliminator assembly 28 and plenum region 26 for ultimate discharge through the fan stack. Simultaneously, hot water delivered to basin 12 gravitationally descends through fill structure 16 and is dispersed. Such initially hot water is thereby sensibly and evaporatively cooled, whereupon it is collected in basin 14 for reuse. The purpose of eliminator assembly 28 is likewise well understood. The eliminator assembly is designed to present a large number of tortuous airflow paths designed to remove entrained water from the crossflowing air currents prior to delivery thereof to the plenum region 26. That is to say, the entrained water droplets tend to impinge upon the walls defining the airflow paths of the eliminator section, with the result that such water gravitates from the eliminator section through the fill structure 16 for ultimate collection in basin 14.

The function of the respective sealing drainboard supports 32 is severalfold, namely to serve as a partial structural support for the individual eliminator sections 30, to seal the joint regions between the sections 30 against passage of airflow therethrough, and to provide proper drainage of collected water back into fill structure 16.

To this end, and referring specifically to FIGS. 4 and 5, it will be seen that each support 32 is in the form an elongated, unitary body preferably formed of a synthetic resin ABS plastic. The support 32 includes an elongated upwardly opening channel 34 designed to receive the lower margin of an eliminator section and is defined by an obliquely oriented bottom wall 36 and a pair of relatively short, upstanding sidewall portions 38, 40 extending along the length of bottom wall 36. It will further be observed that bottom wall 36 includes a downwardly extending elongated U-shaped region 42 formed by laterally spaced-apart side members 46, 48 and interconnecting bight wall 50. Bight wall 50 extends substantially horizontally as will be appreciated from a study of FIG. 4. Finally, bottom wall 36 also has a generally elongated, laterally horizontally extending pad 52 adjacent sidewall portion 40, with pad 52 being essentially coplanar with bight wall 50.

The support 32 is also provided with an elongated, obliquely oriented, substantially imperforate sealing wall 54 which extends from and is integral with sidewall portion 38. The sealing wall 54 extends downwardly from the upper end of portion 38 a sufficient distance to cover the joint between adjacent eliminator sections as will be explained; moreover, the wall 54 terminates in an outturned stiffening edge or flange 56. The wall 54 may have a pair of girt-receiving upright slots 58, 60 therein for purposes to be described.

The drainage section of the support 32 is in the form of an elongated, downwardly and outwardly extending formed tray 62 which extends from and is integral with sidewall portion 40 and presents a lowermost drainage edge 64. The tray 62 has a plurality of spaced-apart, somewhat V-shaped in plan, drainage passageways 66 formed therein. Each passageway 66 is defined by a pair of spaced-apart sidewalls 68, 70 which converge from top to bottom. The sidewalls 68, 70 are interconnected by a bottom wall 72 which, by virtue of the increasing depth of the sidewalls from top to bottom, presents a passageway of increasing depth from a point adjacent sidewall portion 40 to drainage edge 64. Finally, it will be seen that each of the passageways 66 terminates in a lowermost, arcuate water exit edge 74. As best seen in FIG. 5, the tray 62 as depicted has a pair of endmost upright slots 76, 78 which are aligned with corresponding slots 58, 60 in sealing wall 54, along with a somewhat shorter, central slot 80.

One end edge 82 of the support 32 is upraised throughout the extent thereof, i.e., along the entirety of tray 62, sidewall portion 40, bottom wall 36, sidewall portion 38, and sealing wall 54. The opposite end edge 83, however, is not similarly upraised. The edge 82 is upraised sufficiently to permit a shiplap-type interconnection between adjacent sections 32 so as to facilitate end-to-end interconnection of plural sections.

The use of the supports 32 can best be understood through a consideration of FIGS. 2 and 3 which illustrate an adjacent pair of superposed eliminator sections 30 and 30' with sealing support structure in accordance with the invention interposed between the sections. In particular, it will be observed that the lower margin 84 of section 30 is received by the upwardly opening channel 34 of the support 32, with sidewall portion 38 being adjacent the air outlet face of the eliminator section whereas sidewall portion 40 is proximal to the air inlet face thereof. The structural girts 20 of the tower 10 (normally in the form of wooden 2×4's) extend between the eliminator sections 30, 30' in the joint region 86 between such sections. An elongated support or base 88 (typically formed of end-to-end wooden 2×6's) is positioned atop and extend between the girts 20. The baseboards 88 engage the undersides of the bight wall 50 and pad 52 provided in channel bottom wall 36, in order to provide a firm, stable support.

The upper margin 90 of lower eliminator section 30' abuts the undersides of the girts 20 as shown. An elongated retainer 92 in the form of elongated, end-to-end wooden 2×2's, is secured to the undersides of the girts 20 in spanning relationship thereto and adjacent the air inlet face of the section 30'. Retainer 92 thus serves to position and support the lower section 30' in its proper relative orientation.

The depending sealing wall 54 of the section 32 extends downwardly from sidewall portion 38 to a point below the girts 20. For this purpose, and as described, the trays 62 and sealing wall 54 are notched as at 76, 58 and 78, 60 to permit the support 32 to be positioned over the girts and between the sections 30, 30' as depicted. Central slot 80 in tray 62 may be provided to similarly receives a fill support girt (not shown). The wall 54 is imperforate save for the mentioned slots and therefore serves to seal the joint region 86 between the eliminator sections 30, 30' so as to prevent unintended passage of air from fill structure 16 to region 26.

The drainage tray 62 extends downwardly and outwardly relative to eliminator section 30 so that water gravitating from the latter will be concentrated and diverted into fill structure 16 (and thus onto underlying fill bars 17) in relatively large streams. Thus as explained, tray 62 extends obliquely downwardly from sidewall portion 40 to form the lower margin of the support.

FIG. 3 illustrates the interconnection between a pair of end-to-end supports 32, 32a. The interconnected supports are identical, and accordingly like parts been similarly numbered in both cases, with a letter "a" denotation for such parts in the case of support 32a. In any event, it will be seen that the upraised edge 82 of support 32 receives the terminal edge 83a of the adjacent support 32a in a shiplap fashion. Appropriate connectors and/or caulking may be used to join and seal the supports 30, 32a as necessary.

It will be appreciated from the foregoing that the construction of tower drift eliminator 28 is a simple proposition when making use of the supports 32. In such procedures, it is only necessary to install the necessary baseboards 88 in spanning relationship to the girts 20 at joint region 86, followed by positioning of the supports 32 over the girts 20 (making use of the slots 76, 58 and 78, 60 for this purpose) with the wall 50 and pad 52 engaging the upper surfaces of the baseboards 88 and then adding the elongated retainer 92. The next step involves placing the next adjacent eliminator 30 in position by pressing the lower margin 84 thereof into the channel 34 of the previously installed support. In this way, the entire eliminator assembly 28 may be readily and quickly constructed in a stepwise manner. It will also be seen that drainboard supports in accordance with the invention can be easily provided for use in concrete framed towers (see U.S. Pat. No. 3,834,861), and that in such cases appropriate dimensional changes may be required, e.g., the size and location of frame-receiving slots analogous to the 76-80 may be different.

In the use of tower 10, the supports 32 function to simultaneously support the individual eliminator sections 30 while sealing the joint regions 86 therebetween. Furthermore, provision of the specially configured passageways 66 collects and concentrates eliminated water into relatively large streams which fall from the water exits edges 74 for travel through fill structure 16 and ultimately to basin 14. Such large streams are very resistant to reentrainment in the crossflowing air currents passing through tower 10.

The extremely simple and effective construction and operation of the present invention is to be constrasted with conventional custom-fabricated eliminator supports characteristic of the prior art. As depicted in FIGS. 6 and 7, such conventional structure between superposed eliminators sections 30, 30' includes a large number of custom-fabricated wooden beams and supports requiring skilled craftsmen and considerable effort to produce. Thus, the conventional assembly 94 includes, in addition to the preexisting girts 20, an air blocking filler 96 between the girts and a pair of nailing blocks 97 on the outer opposed faces of the girts, all bolted in place by means of bolt 98; an elongated plywood sealing plank 100 extending along the joint region between the eliminator sections; an elongated wooden beam 104 requiring two custom bevels 106 and 108; an elongated plywood drainboard 110 nailed to beam 104 and the blocks 97, which requires custom slotting as at 107; upper and lower plywood inserts 112 and 114, the latter being custom beveled as at 116; and elongated main support boards 117, 118 each requiring a custom bevel as at 120, 122 and being bolted by bolt assembly 124. As is readily apparent from the foregoing recitation, construction of a conventional assembly 94, although technically possible, has represented a rather considerable expense in the manufacture of a water cooling tower. Equally apparent is the fact that the present invention provides a much improved support which eliminates virtually all of the time consuming and costly custom fabrication characteristic of prior eliminator assemblies. As such, the desirability and commercial significance of the sealing drainboard supports of the present invention is manifest.

We claim:

1. A sealing drainboard support adapted to be interposed in a joint region between adjacent, upper and lower, superposed drift eliminator sections of a water cooling tower, said sections each presenting an air inlet face and an opposed air outlet face, said support comprising:

structure defining an elongated, upwardly opening channel for receiving the lower margin of said upper eliminator section;

an elongated upright sealing wall operably coupled with said channel-defining structure and located adjacent said joint region between said upper and lower eliminator sections, said sealing wall being of sufficient height and configured for substantially blocking airflow through said joint region; and elongated drainage means operably associated with said channel-defining structure opposite said sealing wall and located adjacent the air inlet faces of said eliminator sections for collection and concentration of water draining from the upper eliminator section into streams resistant to reentrainment into air currents passing through said water cooling tower.

2. The sealing drainboard support of claim 1, said channel-defining structure, sealing wall and drainage means being intergral to present an elongated, preformed, intregral support.

3. The sealing drainboard support of claim 1, said sealing wall being located adjacent the air outlet faces of said eliminator sections and being obliquely oriented to conform with the orientation of said superposed eliminator sections.

4. The sealing drainboard support of claim 1, said sealing wall being notched at axially spaced locations along the length thereof for receiving structural girts forming a part of said tower.

5. The sealing drainboard support of claim 1, one side edge of said support being slightly upraised to receive an adjacent support in a shiplap fashion in order to facilitate end-to-end interconnection of plural supports.

6. The sealing drainboard support of claim 1, said support being formed of synthetic resin material.

7. The sealing drainboard support of claim 1, said channel-defining structure including an elongated, obliquely oriented bottom wall with a pair of relatively short, upstanding sidewalls extending along the length thereof.

8. The sealing drainboard support of claim 7, including a pair of elongated, generally horizontally disposed pad sections formed in said bottom wall and adapted to engage an underlying, generally horizontal base.

9. The sealing drainboard support of claim 8, one of said pad sections comprising an elongated, generally U-shaped in cross-section portion, the bight of said U-shaped portion being adapted to engage said base.

10. The sealing drainboard support of claim 1, said drainage means comprising an elongated, obliquely disposed tray extending downwardly from the margin of said channel-defining structure proximal to the air inlet face of said upper eliminator section, to a lowest drainage edge.

11. The sealing drainboard support of claim 10, said tray being configured to present a plurality of axially spaced-apart, upwardly opening water drainage passageways therein.

12. The sealing drainboard support of claim 10, each of said passageways being defined by a pair of upright sidewalls and a bottom wall, said passageway sidewalls converging toward each other as the passageway sidewalls extend from a point adjacent the air inlet face of said upper eliminator section to the lowest edge of said tray.

13. The sealing drainboard support of claim 12, each of said passageways being of increasing depth from a point adjacent the air inlet face of said upper eliminator section to the lowest edge of said tray.

14. A sealing drainboard support adapted to be interposed in a joint region between adjacent, upper and lower, superposed drift eliminator sections of a water cooling tower, said sections each presenting an air inlet face and an opposed air outlet face, said support comprising:

an elongated, integral, synthetic resin body presenting an upwardly opening channel, an upright sealing wall, and drainage means, said channel being defined by an elongated, obliquely oriented bottom wall and a pair of relatively short, upstanding sidewalls extending along the length of said bottom wall, said channel being configured for receiving the lower margin of said upper eliminator section with said sidewalls being respectively located and extending along the air inlet and air outlet faces of said upper section, said sealing wall extending downwardly from said sidewall adjacent the air outlet face of said upper section and being of a height to cover said joint region for blocking airflow therethrough, said drainage means comprising an elongated, obliquely disposed tray extending downwardly from said sidewall adjacent the air inlet face of said upper section to a lowest drainage edge, said tray being configured to present a plurality of spaced-apart, water drainage passageways therein, each of said passageways being defined by a pair of upright sidewalls and a bottom wall, the depth of each of said passageways increasing from top to bottom of said tray, and said passageway sidewalls converging towards each other as the passageways sidewalls extend from top to bottom of said tray, whereby water gravitating from said upper eliminator section is collected and concrentrated into a plurality of individual, descending streams resistant to reentrainment thereof into air currents passing through said tower.

15. The sealing drainboard support of claim 14, said channel bottom wall being configured to present an elongated pad section adapted to engage an underlying, generally horizontal base.

16. The sealing drainboard support of claim 14, said tray and sealing wall being configured to present aligned sets of laterally spaced-apart notches for receiving structural girts forming a part of said tower.

* * * * *